(12) United States Patent
Ito

(10) Patent No.: US 7,366,330 B2
(45) Date of Patent: Apr. 29, 2008

(54) METHOD, APPARATUS, AND PROGRAM FOR DETECTING FACES

(75) Inventor: Wataru Ito, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 202 days.

(21) Appl. No.: 11/379,247

(22) Filed: Apr. 19, 2006

(65) Prior Publication Data

US 2007/0019863 A1 Jan. 25, 2007

(30) Foreign Application Priority Data

Apr. 19, 2005 (JP) ............................. 2005-121023

(51) Int. Cl.
*G06K 9/00* (2006.01)
(52) U.S. Cl. .................................................. 382/118
(58) Field of Classification Search ........ 382/115–118, 382/100, 103, 162–167, 190, 218, 155–159, 382/224–228, 240, 216, 298–299; 340/5.52–5.53, 340/5.81–5.83; 348/14.01–14.16, 77–78; 345/418–428, 581–589; 715/723, 719
See application file for complete search history.

(56) References Cited

U.S. PATENT DOCUMENTS

| | | | |
|---|---|---|---|
| 6,697,504 B2 * | 2/2004 | Tsai ............................. | 382/118 |
| 6,879,709 B2 * | 4/2005 | Tian et al. .................... | 382/118 |
| 7,206,445 B2 * | 4/2007 | Takemoto ..................... | 382/162 |
| 2006/0120572 A1 * | 6/2006 | Li et al. ....................... | 382/118 |
| 2007/0047824 A1 * | 3/2007 | Ito .............................. | 382/228 |

FOREIGN PATENT DOCUMENTS

JP 2004-133637 A 4/2004

OTHER PUBLICATIONS

Rowley et al., Neural Network-Based Face Detection, IEEE 0182-8828/98, 1999, pp. 23-38.*

* cited by examiner

*Primary Examiner*—Ishrat Sherali
(74) *Attorney, Agent, or Firm*—Sughrue Mion, PLLC

(57) ABSTRACT

Processing time is reduced and detection is expedited in a face detecting process that detects faces of various sizes included in an image, by detecting faces within images while varying the size of faces to be detected. Faces are detected in order from larger faces to smaller faces. If a face is detected during the process, detection is continued, excluding the region in which the detected face was included.

9 Claims, 14 Drawing Sheets

FIG.7
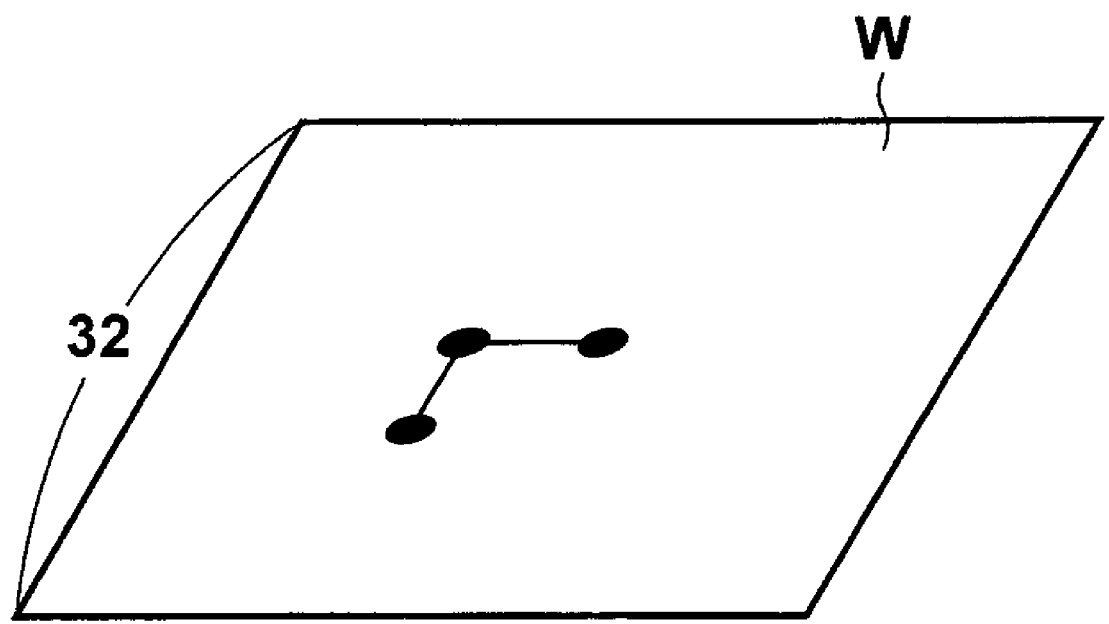
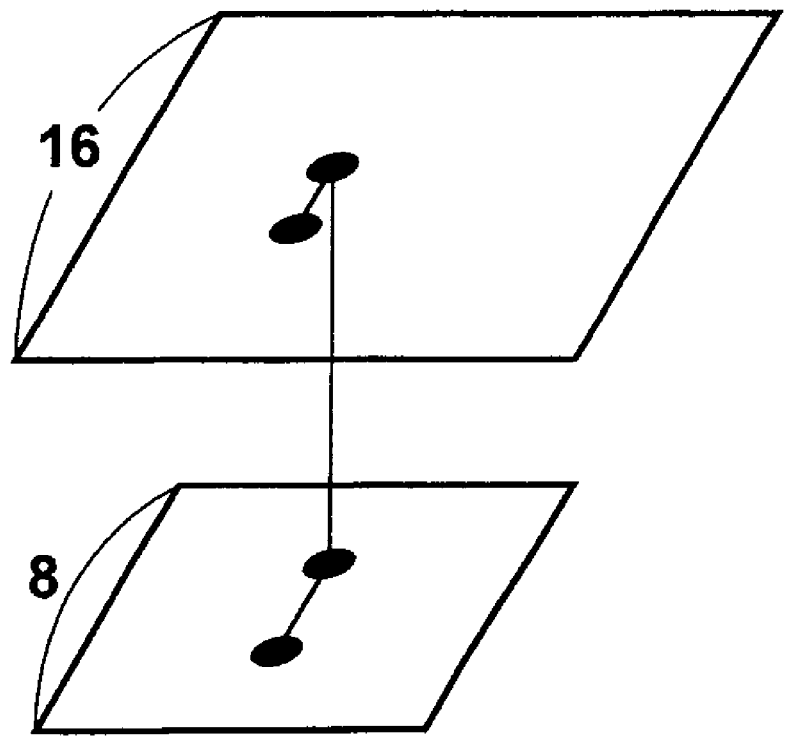

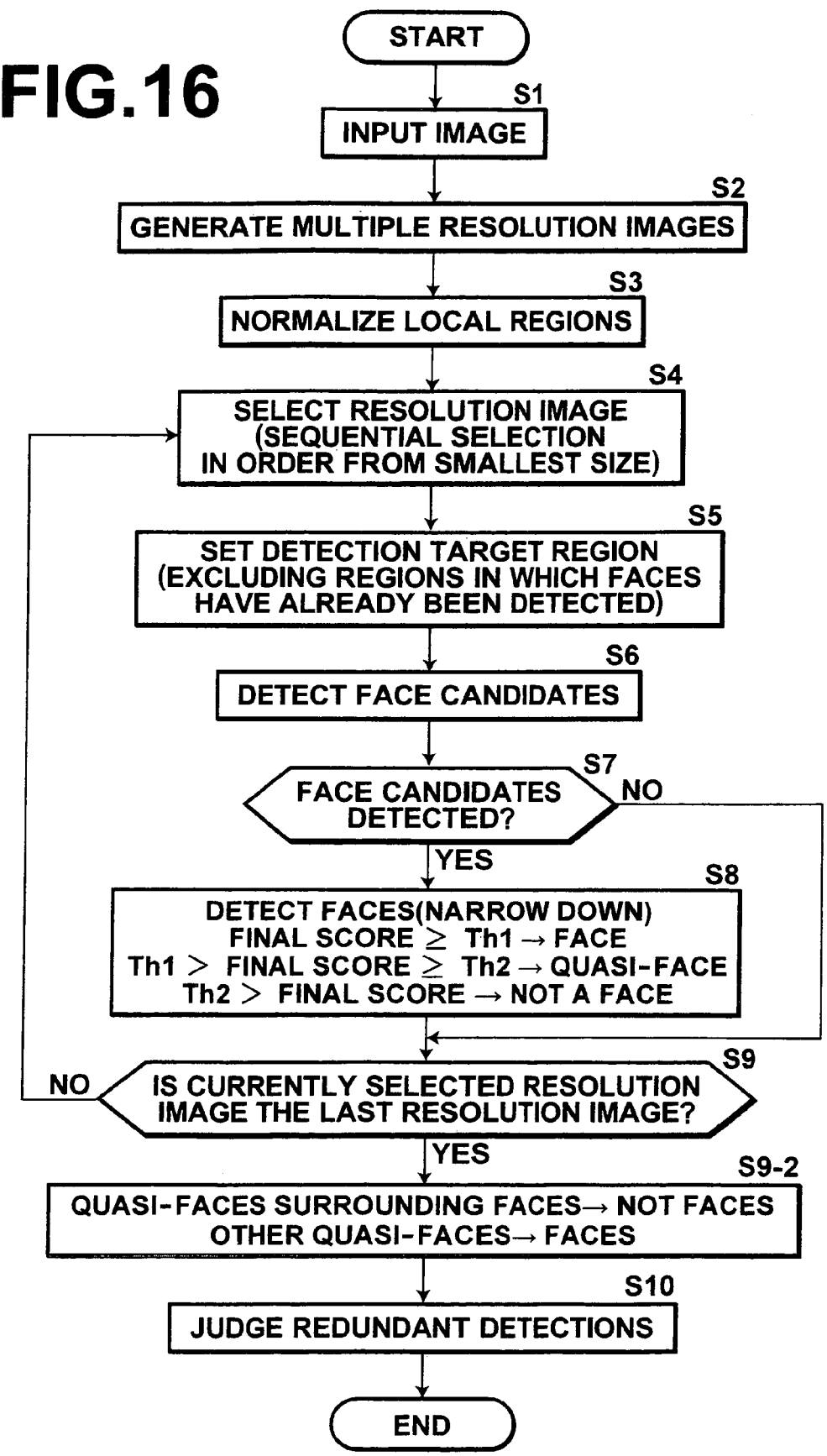

METHOD, APPARATUS, AND PROGRAM FOR DETECTING FACES

BACKGROUND OF THE INVENTION

1. Field of the Invention

The present invention relates to a method, an apparatus, and a program for detecting faces, which are included in detection target images.

2. Description of the Related Art

Correction of skin tones in snapshots photographed with digital cameras by investigating color distributions within facial regions, and recognition of people who are pictured in digital images obtained by digital video cameras of security systems is being performed. In these cases, it is necessary to detect regions (facial regions) of unspecified sizes within digital images that correspond to people's faces. For this reason, various techniques have been proposed, for detecting faces of various sizes from within images.

For example, Japanese Unexamined Patent Publication No. 2004-133637 discloses a method for detecting faces of different sizes. In this method, a plurality of scaled images having different sizes that represent a detection target image are generated, based on the detection target image. Partial images of a uniform size are sequentially cut out from the scaled images, by shifting the position of the cutout across the entirety of each of the scaled images. Correlative values, representing the likelihood that the subject of the partial image is a face, are calculated for each partial image. Faces included in the detection target image are detected by judging whether the partial images represent faces, based on the magnitudes of the correlative values. According to this method, judgments are performed regarding each of the partial images, which are sequentially cut out from the scaled images. Therefore, faces can be detected with comparatively high accuracy.

However, it is necessary to perform judgments for each of the partial images, which have been cut out from each of the scaled images, in the above method. Therefore, the amount of data to be processed is great, and there is a problem that face detection requires a long amount of time.

SUMMARY OF THE INVENTION

The present invention has been developed in view of the foregoing circumstances. It is an object of the present invention to provide a method, an apparatus, and a program for detecting faces that shortens the processing time of face detection, to expedite face detection.

The face detecting method of the present invention comprises:

a face size setting step, for setting the size of faces to be detected from within a detection target image to various sizes; and a detecting step, for detecting faces of the size set in the face size setting step from within the detection target image;

the face size setting step and the detecting step being repeated, thereby detecting faces of different sizes included in the detection target image;

the face size setting step setting the size of faces to be detected such that the size decreases from large to small; and the detecting step detecting faces from regions within the detection target image, excluding regions in which faces have already been detected.

The face detecting method of the present invention may adopt a configuration, wherein:

the detecting step employs characteristic amounts related to the brightness distribution of the detection target image to detect faces and quasi-faces that exhibit degrees of likelihood of being faces less than the detected faces; and the method further comprises:

a judging step, for judging quasi-faces that surround the positions of the detected faces as not being faces, after the face size setting step and the detecting step have been repeated a plurality of times, while judging other quasi-faces to be faces.

In this case, the detecting step may:

employ the characteristic amounts to calculate an index that represents the probability that a partial image, cut out from the detection target image, is an image that includes a face;

detect the subject of the partial image as a face if the index is greater than or equal to a first threshold value; and detect the subject of the partial image as a quasi-face if the index is less than the first threshold value and greater than or equal to a second threshold value, which is less than the first threshold value.

The face detecting apparatus of the present invention comprises:

face size setting means, for setting the size of faces to be detected from within a detection target image to various sizes; and detecting means, for detecting faces of the size set in the face size setting step from within the detection target image;

the setting of the face size and the detection of the faces being repeated, thereby detecting faces of different sizes included in the detection target image;

the face size setting means setting the size of faces to be detected such that the size decreases from large to small; and the detecting means detecting faces from regions within the detection target image, excluding regions in which faces have already been detected.

The face detecting apparatus of the present invention may adopt a configuration, wherein:

the detecting means employs characteristic amounts related to the brightness distribution of the detection target image to detect faces and quasi-faces that exhibit degrees of likelihood of being faces less than the detected faces; and the apparatus further comprises:

judging means, for judging quasi-faces that surround the positions of the detected faces as not being faces, after the face size setting step and the detecting step have been repeated a plurality of times, while judging other quasi-faces to be faces.

In this case, the detecting means may:

employ the characteristic amounts to calculate an index that represents the probability that a partial image, cut out from the detection target image, is an image that includes a face;

detect the subject of the partial image as a face if the index is greater than or equal to a first threshold value; and detect the subject of the partial image as a quasi-face if the index is less than the first threshold value and greater than or equal to a second threshold value, which is less than the first threshold value.

The program of the present invention causes a computer to execute:

a face size setting procedure, for setting the size of faces to be detected from within a detection target image to various sizes; and a detecting procedure, for detecting faces of the size set in the face size setting step from within the detection target image;

the face size setting procedure and the detecting procedure being repeated, thereby detecting faces of different sizes included in the detection target image;

the face size setting procedure setting the size of faces to be detected such that the size decreases from large to small; and the detecting procedure detecting faces from regions within the detection target image, excluding regions in which faces have already been detected.

The program of the present invention may adopt a configuration, wherein:

the detecting procedure employs characteristic amounts related to the brightness distribution of the detection target image to detect faces and quasi-faces that exhibit degrees of likelihood of being faces less than the detected faces; and the program further comprises:

a judging procedure, for judging quasi-faces that surround the positions of the detected faces as not being faces, after the face size setting step and the detecting step have been repeated a plurality of times, while judging other quasi-faces to be faces.

In this case, the detecting procedure may:

employ the characteristic amounts to calculate an index that represents the probability that a partial image, cut out from the detection target image, is an image that includes a face;

detect the subject of the partial image as a face if the index is greater than or equal to a first threshold value; and detect the subject of the partial image as a quasi-face if the index is less than the first threshold value and greater than or equal to a second threshold value, which is less than the first threshold value.

Here, "setting the size of faces to be detected such that the size decreases from large to small" simply means that the size is set to decrease from larger to smaller. It is not limited to decreasing the size of the faces to be detected at each setting step.

In addition, "setting the size of faces to be detected such that the size decreases from large to small" means that the relative size of the faces to be detected with respect to the detection target image is decreased. For example, the size of the faces to be detected may be fixed, and the size (resolution) of the detection target image may be increased from small to large.

Note that the face detecting program of the present invention may be provided being recorded on computer readable media. Those who are skilled in the art would know that computer readable media are not limited to any specific type of device, and include, but are not limited to: floppy disks; RAM's; RM's; CD's; magnetic tapes; hard disks; and internet downloads, by which computer instructions may be transmitted. Transmission of the computer instructions through a network or through wireless transmission means is also within the scope of the present invention. In addition, the computer instructions may be in the form of object, source, or executable code, and may be written in any language, including higher level languages, assembly language, and machine language.

According to the method, the apparatus, and the program for detecting faces of the present invention, faces are searched for within the detection target image sequentially, starting with larger faces. If a face is detected, the region in which the detected face is included is excluded from further searching. As it can be assumed that no faces larger than the detected face are present within the region in which the detected face is included, extraneous detection processes for this region can be omitted. Thereby, processing time can be shortened, that is, expedited face detection is enabled.

BRIEF DESCRIPTION OF THE DRAWINGS

FIG. 7 is a diagram for explaining calculation of characteristic amounts by the weak classifiers.

FIG. 16 is a flow chart that illustrates the processes performed by the face detecting system according to the second embodiment.

DESCRIPTION OF THE PREFERRED EMBODIMENTS

Figure 1:
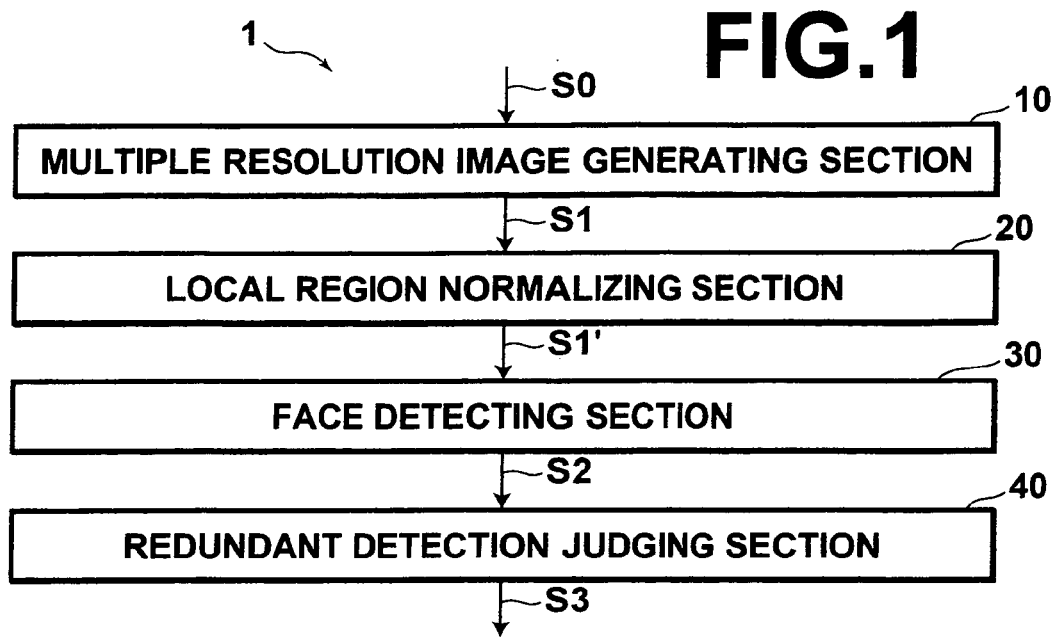
FIG. 1 is a schematic block diagram that illustrates the construction of a face detecting system according to a first embodiment of the present invention.

Hereinafter, an embodiment of the present invention will be described. FIG. 1 is a schematic block diagram that illustrates the construction of a face detecting system 1 (a first embodiment), to which the face detecting apparatus of the present invention has been applied. The face detecting system 1 detects faces included in digital images, regardless of the position, the size, the facing direction, and the rotational direction thereof. As illustrated in FIG. 1, the face detecting system 1 comprises: a multiple resolution image generating section 10, for converting the resolution of input images S0, which are target images in which faces are to be detected, to obtain a plurality of images S1 (S1_1, S1_2, . . . S1_n)having different resolutions (hereinafter, referred to as "resolution images"); a local region normalizing section 20 (normalizing means), for administering normalization (hereinafter, referred to as "local region normalization") to suppress fluctuations in contrast of each local region within the entirety of the resolution images S1_i, to obtain a plurality of resolution images S1' (S1'_1, S1'_2, . . . S1'_n), on which local region normalization has been administered, as a preliminary process that improves the accuracy of a face detecting process to be executed later; a face detecting section 30, for administering a face detecting process on each of the locally normalized resolution images S1', to detect images S2 that represent faces (hereinafter, referred to as "facial images"); and a redundant detection discriminating section 40, for organizing each of the faces S2 detected in each of the resolution images S'1_i, by discriminating whether the same face has been redundantly detected based on the positional relationships therebetween, to obtain faces S3, which have not been redundantly detected.

Figure 2:
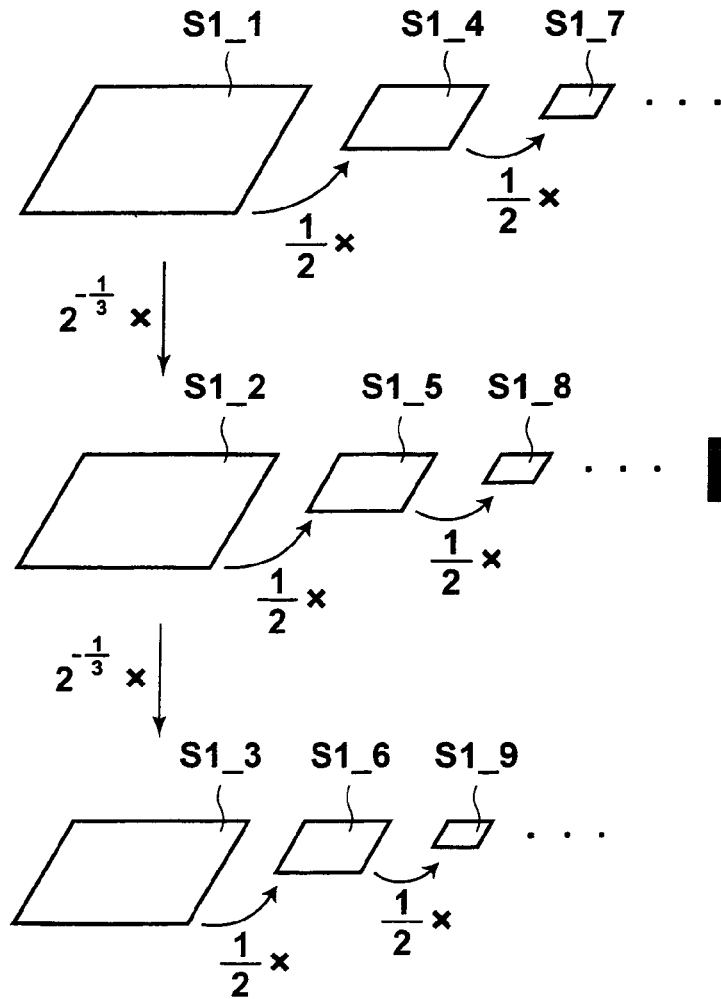
FIG. 2 is a diagram that illustrates the process by which multiple resolution images are generated for extraction target images.

The multiple resolution image generating section 10 converts the resolution (image size) of the input image S0, to standardize the resolution to a predetermined resolution, for example, a rectangular image having 416 pixels per side, to obtain a standardized input image S0'. Then, resolution conversion is administered, using the image S0' as the basic image, to generate the plurality of resolution images S1_i having different resolutions and to obtain the resolution image group S1. The reason for generating the plurality of resolution images S1_i is as follows. Generally, the sizes of faces, which are included in the input image S0, are unknown. However, it is necessary for the sizes of faces (image size) to be detected to be uniform, due to the configuration of classifiers, to be described later. Therefore, partial images of a predetermined size are cut out from images having different resolutions, and discriminations are performed regarding whether the partial images represent faces or subjects other than faces. Specifically, the standardized input image S0' is employed as a basic image S1_1, which is multiplied by $2^{-1/3}$, to obtain an image S1_2, as illustrated in FIG. 2. The image S1_2 is multiplied by $2^{-1/3}$, to obtain an image S1_3. Thereafter, reduced images S1_4, S1_5, and S1_6, which are ½ the size of the original images, are generated for each of the images S1_1, S1_2, and S1_3, respectively. Further, reduced images S1_7, S1_8, and S1_9, which are ½ the sizes of the reduced images S1_4, S1_5, and S1_6, respectively, are generated. The generation of reduced images is repeated until a predetermined number of reduced images are obtained. Reduced images, which are $2^{-1/3}$ times the resolution of ½ size reduced images, which do not require interpolation of pixel values that represent brightness, can be generated quickly by this method of reduced image generation. For example, if the resolution image S1_1 is a rectangular image having 416 pixels in its shorter sides, the resolution images S1_2, S1_3, . . . will be rectangular images having shorter sides of 330 pixels, 262 pixels, 208 pixels, 165 pixels, 131 pixels, 104 pixels, 82 pixels, 65 pixels, . . . respectively. That is, the plurality of resolution images being reduced in increments of $2^{-1/3}$x can be obtained. Note that the images, which are generated without interpolating pixel values, tend to bear the characteristics of the image patterns of the original images. Therefore, these reduced images are preferable from the viewpoint of improving the accuracy of the face detecting process.

The local region normalizing section 20 administers a first brightness gradation converting process and a second brightness gradation converting process on each resolution image within the resolution image group S1. The first brightness gradation converting process causes degrees of variance of pixel values representing brightness, which are greater than or equal to a first predetermined level, to approach a second predetermined level, which is higher than the first predetermined level, for each of a plurality of local regions within the resolution images of the resolution image group S1. The second brightness gradation converting process causes degrees of variance of pixel values representing brightness, which are less than the first predetermined level, to be suppressed such that it is lower than the second predetermined level, for each of a plurality of local regions within the resolution images of the resolution image group S1. Here, the specific processes performed by the local region normalizing section 20 will be described.

Figure 12:
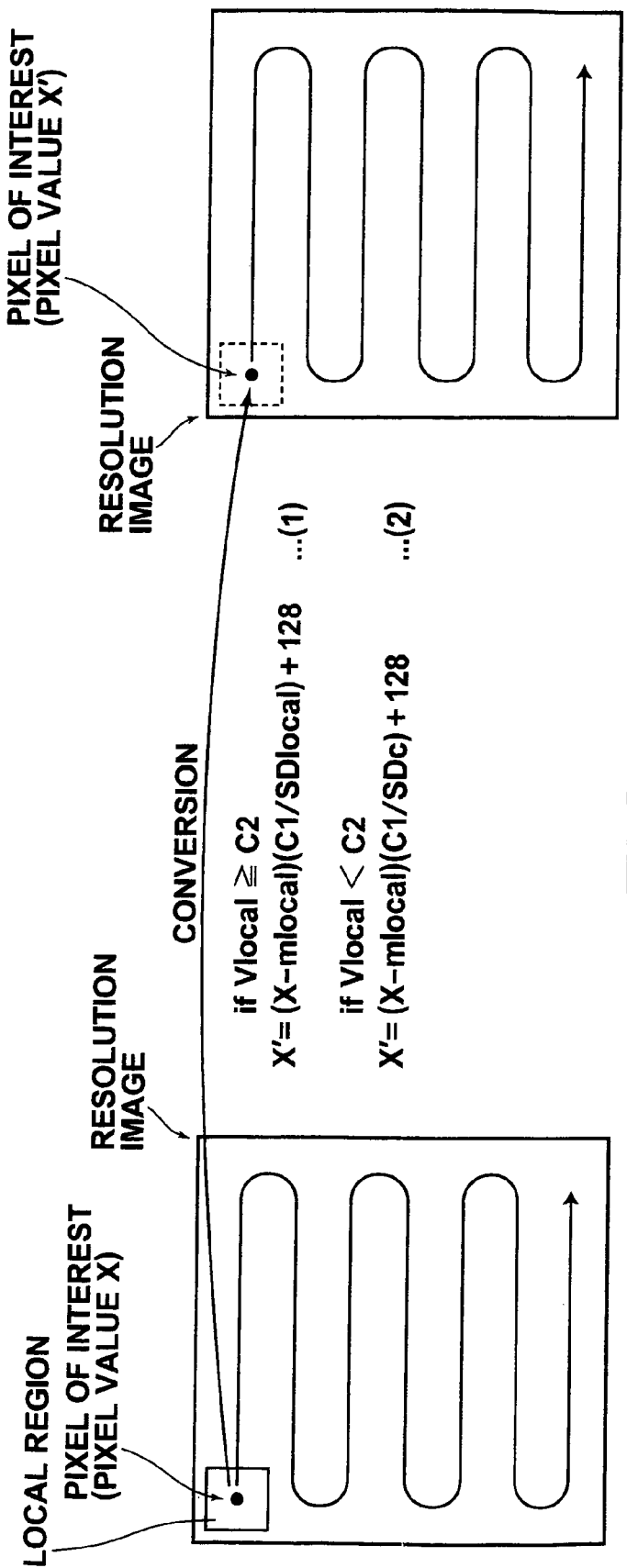
FIG. 12 is a diagram that illustrates the concept of a local region normalizing process.
Figure 13:
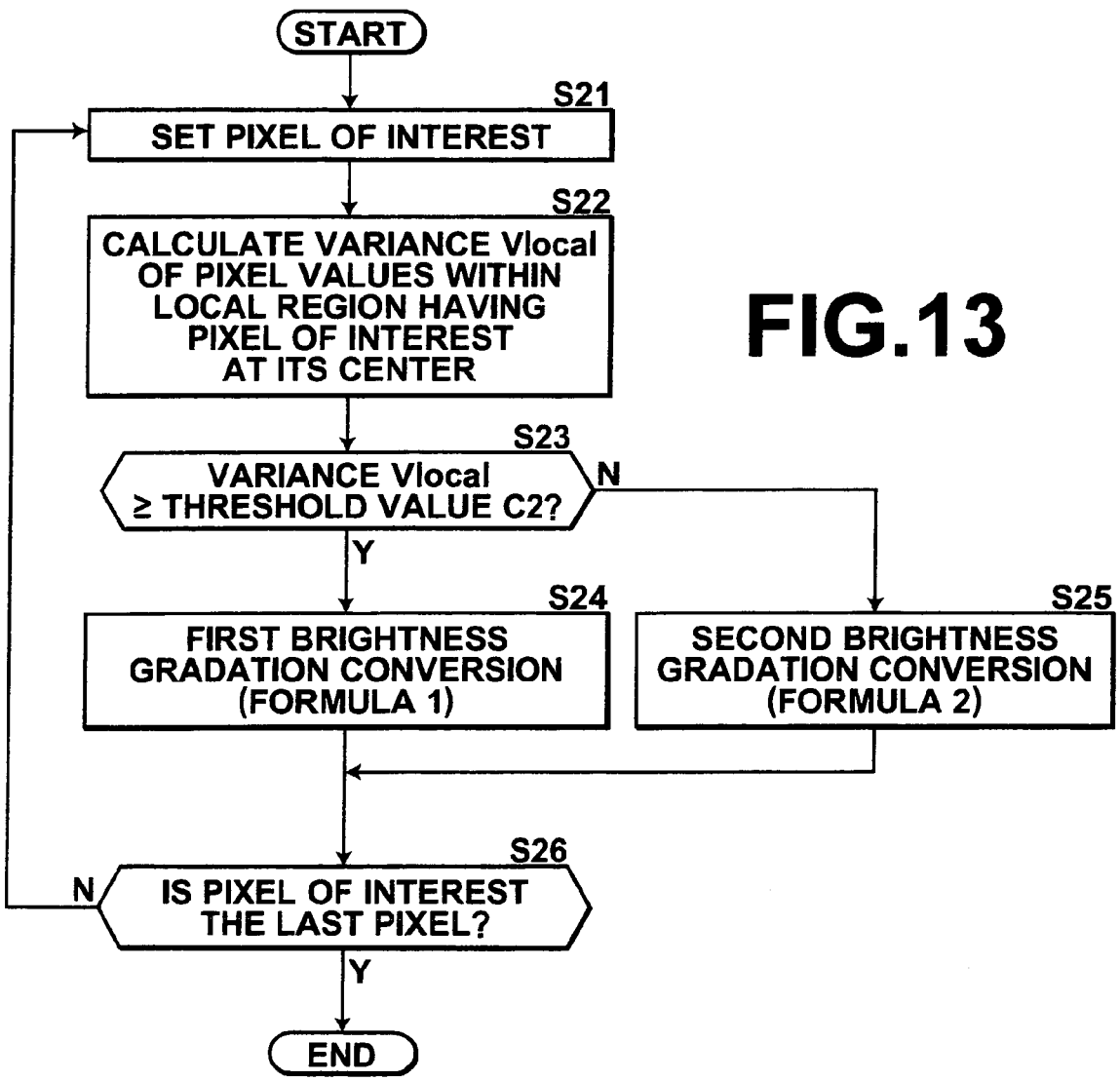
FIG. 13 is a flow chart that illustrates the processes performed by a local region normalizing section.

FIG. 12 is a diagram that illustrates the concept of a local region normalizing process, and FIG. 13 is a flow chart that illustrates the processes performed by the local region normalizing section 20. Formulas (1) and (2) are formulas for converting the gradations of pixel values in the local region normalizing process.

If Vlocal≧C2

$$X' = (X - m\text{local})(C1/SD\text{local}) + 128 \quad (1)$$

If Vlocal<C2

$$X' = (X - m\text{local})(C1/SDc) + 128 \quad (2)$$

wherein:

X: pixel value of a pixel of interest;

X': pixel value after conversion;

mlocal: mean pixel value within a local region having the pixel of interest as its center;

Vlocal: variance of pixel values within the local region;

Sdlocal: standard deviation of pixel values within the local region;

(C1×C1): reference value;

C2: threshold value; and

SDc: constant

Here, X represents the pixel value of a pixel of interest; X' represents the pixel value of the pixel of interest after conversion; mlocal represents a mean pixel value within a local region having the pixel of interest as its center; Vlocal represents the variance of pixel values within the local region; SD local represents the standard deviation of pixel values within the local region; (C1×C1) represents a reference value that corresponds to the second predetermined level; C2 represents a threshold value that corresponds to the first predetermined level; and SDc is a predetermined constant. Note that the number of brightness gradations is expressed as 8 bit data, and that the pixel values range from 0 to 255 in the present embodiment.

As illustrated in FIG. 13, the local region normalizing section 20 sets a pixel within a resolution image as a pixel of interest step S21). Next, the variance Vlocal, among pixel values within a local region of a predetermined size, for example, 11×11 pixels, having the pixel of interest at its center, is calculated (step S22). Then, it is judged whether the calculated variance Vlocal is greater than or equal to a threshold value C2 that corresponds to the first predetermined level (step S23). In the case that the discrimination results of step S23 indicate that the variance Vlocal is greater than or equal to the threshold value C2, the first brightness gradation converting process is administered according to Formula (1) (step S24). The first brightness gradation converting process causes the difference between the pixel value X of the pixel of interest and the mean value mlocal to become smaller, as the difference between the variance Vlocal and the reference value (C1×C1) corresponding to the second predetermined level become greater when the variance Vlocal is greater than the reference value, and causes the difference between the pixel value X of the pixel of interest and the mean value mlocal to become greater, as the difference between the variance Vlocal and the reference value (C1×C1) become greater when the variance Vlocal is less than the reference value. On the other hand, in the case that the variance Vlocal is judged to be less than the threshold value C2, a linear gradation conversion, which does not depend on the variance Vlocal, is administered according to Formula (2), as the second brightness gradation converting process (step S25). Thereafter, it is judged whether the pixel of interest set in step S21 is the last pixel (step S26). If it is judged in step S26 that the pixel of interest is not the last pixel, the process returns to step 21, and a next pixel within the resolution image is set as the pixel of interest. On the other hand, if it is judged that the pixel of interest is the last pixel in step S26, the local region normalizing process for the resolution image ends. By repeating the processes performed in steps S21 through S26 in this manner, a resolution image, on which the local region normalizing process has been administered, is obtained. The local region normalized resolution image group S1' is obtained, by administering the sequence of processes on each of the resolution images of the resolution image group S1.

Note that the first predetermined level may be varied according to the brightness of the entirety or a portion of the local regions. For example, the threshold value C2 may be varied according to the pixel value of the pixel of interest. That is, the threshold value C2 corresponding to the first predetermined level may be set to be high when the brightness of the pixel of interest is relatively high, and set low when the brightness of the pixel of interest is relatively low. By setting the threshold value C2 in this manner, faces, which are present within regions having low brightness, that is, dark regions with low contrast (a state in which the variance of pixel values is low) can also be correctly normalized.

Here, a case is described in which only local region normalizing processes are administered on the resolution images. Alternatively, different normalization processes may be performed as well. For example, gradation conversion may be administered employing an LUT (Look Up Table), which is designed to increase contrast (to increase the variance of pixel values) in regions having low brightness, that is, dark regions. Then, the aforementioned local normalizing processes may be administered. By performing the gradation conversion employing the LUT, the same effects as those obtained by varying the threshold value C2 according to the pixel value of the pixel of interest can be obtained. That is, faces, which are present within dark regions with low contrast can also be correctly normalized.

Figure 3:
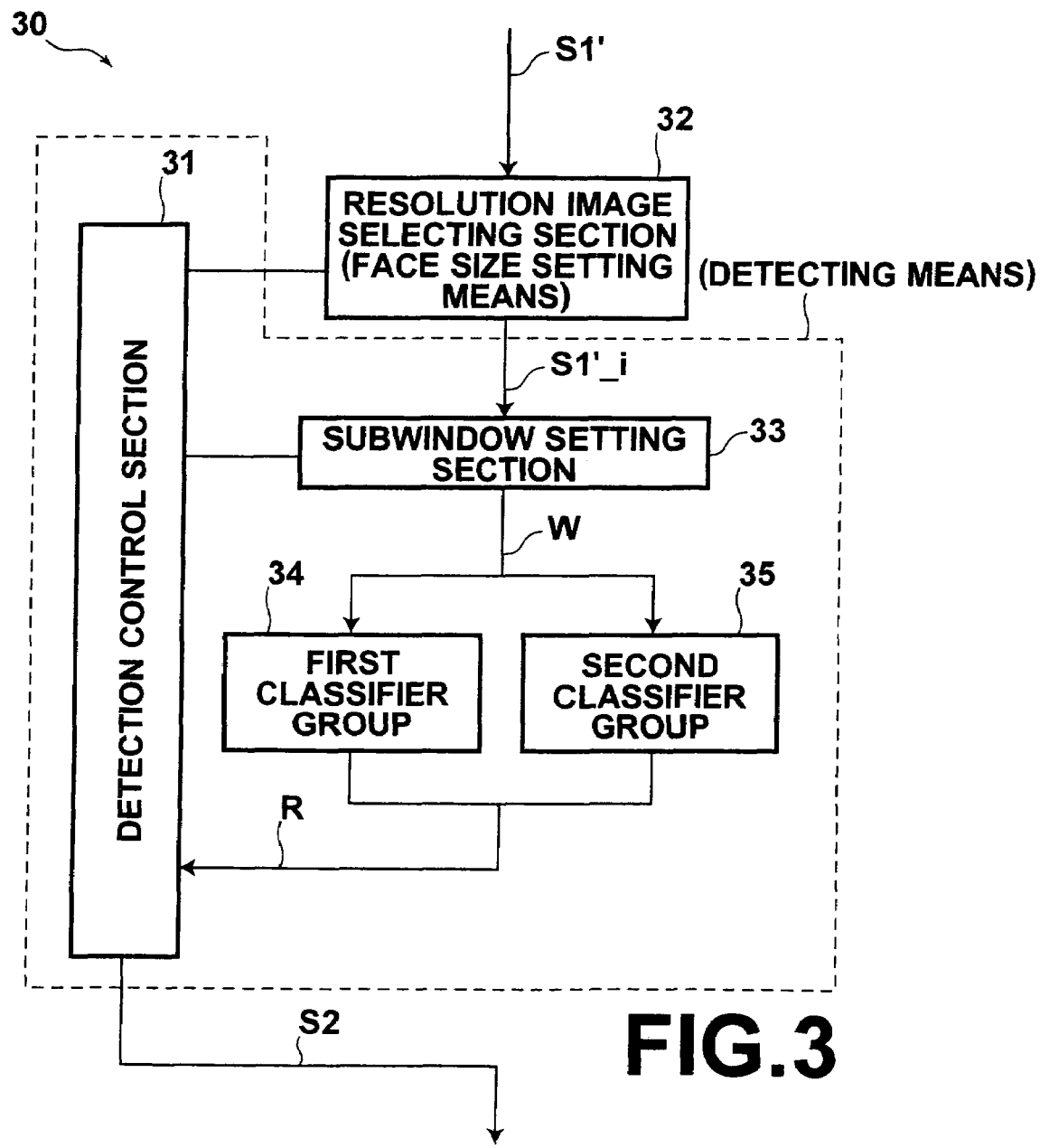
FIG. 3 is a block diagram that illustrates the construction of a face detecting section.

The face detecting section 30 administers a face detecting process on each image of the resolution image group S1', on which the local region normalizing processes have been administered, to detect faces S2 therein. FIG. 3 is a block diagram that illustrates the construction of the face detecting section 30. As illustrated in FIG. 3, the face detecting section 30 comprises: a detection control section 31, for controlling the components to be described below in sequence during the face detecting process; a resolution image selecting section 32 (face size setting means), for sequentially selecting resolution images from the resolution image group S1', starting with smaller sized resolution images; a subwindow setting section 33, for sequentially setting subwindows for cutting out partial images W (discrimination target images), which become targets of discrimination regarding whether a face is pictured therein, within each resolution image selected by the resolution image selecting section 32; a first classifier group 34 and a second classifier group 35, for discriminating whether the cut out partial images W are facial images. In the present embodiment, the resolution image selecting section 32 functions as the face setting means of the present invention, and the detection control section 31, the subwindow setting section 33, and the first and second classifier groups 34 and 35 function as the detecting means of the present invention.

The detection control section 31 controls the resolution image selecting section 32 and the subwindow setting section 33 to perform stepwise face detecting processes on each of the images of the resolution image group S1'. In the first step, face candidates are roughly detected, and in the second step, true facial images S2 are extracted from the face candidates. For example, the detection control section 31 commands the resolution image selecting section 32 to select a resolution image, issues subwindow setting conditions to the subwindow setting section 33, and outputs detection results to the redundant detection discriminating section 40. Note that the subwindow setting conditions include: the region on the image where the subwindow is set (detection target region); the movement interval of the subwindow (roughness of detection); and the classifier group to be employed for discrimination (rough/accurate detecting mode). The detection target region refers to the detection target region particularly during the initial rough detection. The detection target region is set within regions of a currently selected resolution image, excluding regions corresponding to those in which faces have already been detected, during the process of sequentially providing resolution images for the face detecting process from smallest to largest.

The resolution image selecting section 32 sequentially selects resolution images from the resolution image group S1' from the smallest (lowest resolution) to largest (highest resolution), according to commands issued by the detection control section 31. Note that the face detecting method of the present embodiment detects faces within the input image S0, by discriminating whether the partial images W of a uniform size, which are sequentially cut out from the resolution images, are facial images. Therefore, the resolution image selecting section 32 selecting the resolution images from smaller images to larger images is equivalent to varying the setting of the size of the faces to be detected from within the input image S0 (detection target image) from larger to smaller sizes.

The subwindow setting section 33 sequentially sets subwindows within the resolution image selected by the resolution image selecting section 32, while moving the positions of the subwindows, based on the subwindow setting conditions set by the detection control section 31. For example, during the initial rough detection, 32×32 pixel partial images W are cut out, while rotating each of the resolution images 360 degrees within the plane thereof and moving the position of the subwindow a predetermined distance, for example, 5 pixels. The subwindow setting section 33 outputs the cut out partial images W to the first classifier group 34. As will be described later, each classifier that constitutes the classifier group discriminates facial images of faces of predetermined rotations and facing directions, respectively. This configuration enables discrimination of faces of various rotations and facing directions. In addition, when narrowing down the facial image candidates detected by the rough detection, the subwindows are sequentially set only within regions of a predetermined size in the vicinities of the facial image candidates, while being moved in smaller increments, for example, 1 pixel increments. Partial images W are cut out from the regions, and output to the second classifier group 35.

The first classifier group 34 comprises a plurality of classifiers for discriminating whether a partial image W is a facial image at comparatively high speeds. The plurality of classifiers are connected in parallel. Each of the plurality of classifiers is a different type of classifier, respectively capable of discriminating faces facing different directions. That is, the plurality of classifiers comprises: a forward facing face classifier 341, for discriminating forward facing faces; a left profile face classifier 342, for discriminating left profiles of faces; and a right profile face classifier 343, for discriminating right profiles of a faces. The plurality of classifiers are employed to roughly detect facial image candidates from within the resolution images.

The second classifier group 35 comprises a plurality of classifiers for discriminating whether a partial image W is a facial image with comparatively high accuracy. The plurality of classifiers are connected in parallel. Each of the plurality of classifiers is a different type of classifier, respectively capable of discriminating faces facing different directions. That is, the plurality of classifiers comprises: a forward facing face classifier 351, for discriminating forward facing faces; a left profile face classifier 352, for discriminating left profiles of faces; and a right profile face classifier 353, for discriminating right profiles of a faces. The plurality of classifiers are employed to perform fine detection processes regarding the facial image candidates detected by the aforementioned rough detection, to extract true facial images S2 from the facial image candidates.

Figure 4:
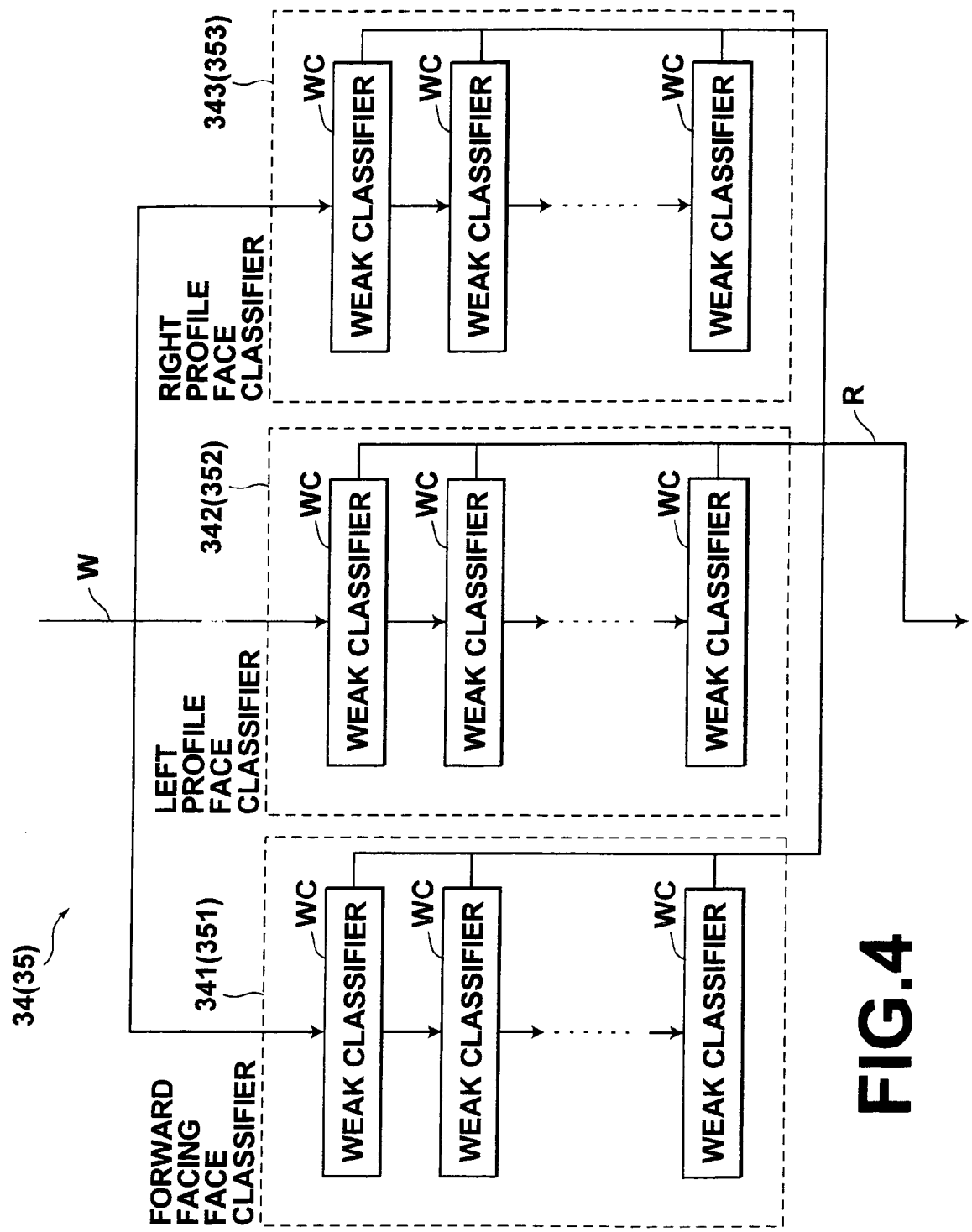
FIG. 4 is a block diagram that illustrates the construction of a first and second classifier group.

Note that each of the classifiers 341, 342, 343, 351, 352, and 353 comprise a plurality of weak classifiers WC, which are linearly linked in a cascade structure, as illustrated in FIG. 4. The weak classifiers calculate at least one characteristic amount related to the brightness distributions of the partial images W, and employ the at least one characteristic amount to discriminate whether the partial images W are facial images.

The first classifier group 34 and the second classifier group 35 discriminate whether each of the sequentially input partial images W are forward facing faces, left profiles of faces, or right profiles of faces, by employing the three types of classifiers. The first classifier group 34 and the second classifier group 35 output the results of discrimination as discrimination results R. Note that classifiers for discriminating leftward obliquely facing faces and rightward obliquely facing faces may further be provided, to improve the detection accuracy for obliquely facing faces.

Figure 5:
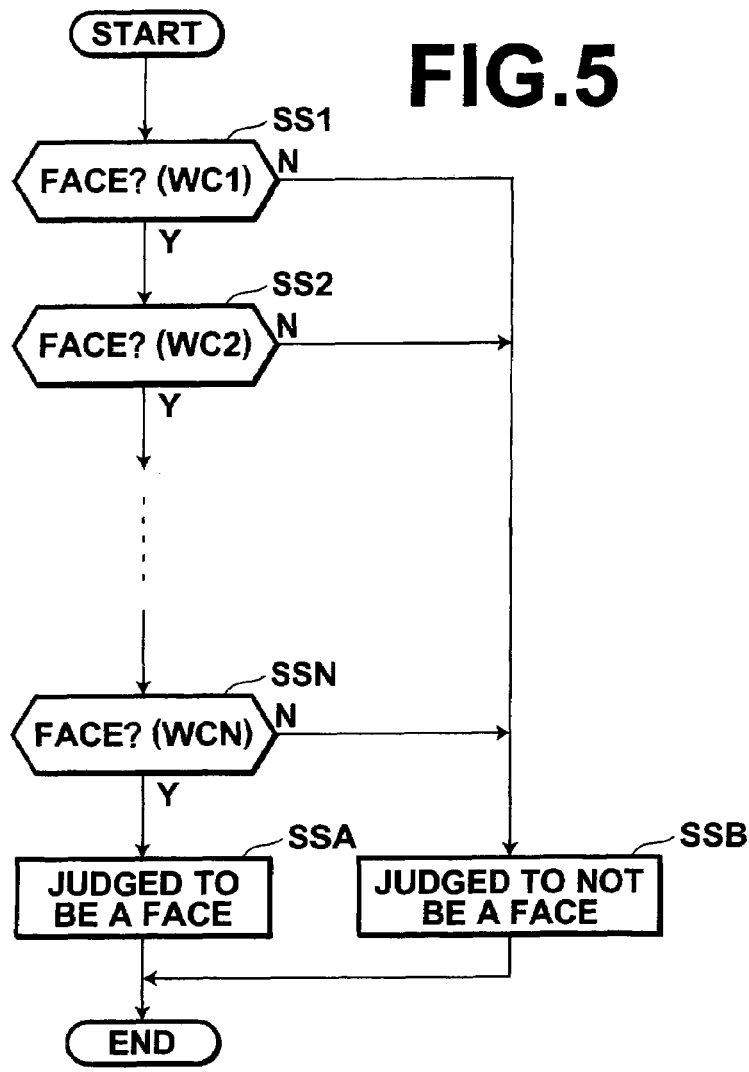
FIG. 5 is a flow chart that illustrates an outline of the processes performed by a classifier.
Figure 6:
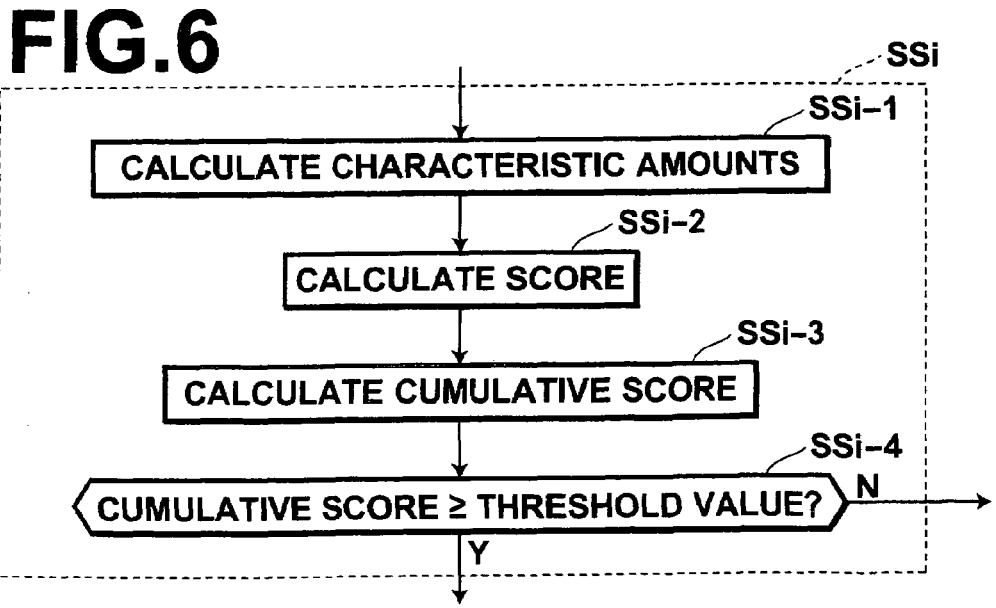
FIG. 6 is a flow chart that illustrates the processes performed by the weak classifiers within the classifier.

Here, the specific processes performed by each of the classifiers will be described with combined reference to FIG. 5 and FIG. 6. FIG. 5 is a flow chart that illustrates an outline of the processes performed by each of the classifiers. FIG. 6 is a flow chart that illustrates the processes performed by the weak classifiers within the classifiers.

First, the first weak classifier WC1 judges whether a partial image of the predetermined size, which has been cut out from a resolution image S1'_i, represents a face (step SS1). Specifically, the weak classifier WC1 obtains a 16×16 pixel size image and an 8×8 pixel size image as illustrated in FIG. 7, by administering a four neighboring pixel average process on a 32×32 pixel size image, twice. The four neighboring pixel average process sections the partial image into 2×2 pixel blocks, and assigns the average pixel values of the four pixels within the blocks as the pixel value of pixels that correspond to the blocks. Pairs of points are set within the three images. The differences between the pixel values of points of each pair within a pair group constituted by a plurality of different types of pairs are calculated, and the combinations of the differences are designated to be the characteristic amounts (step SS1-1). The two points that constitute each pair may be two predetermined points which are aligned in the vertical direction or the horizontal direction so as to reflect density characteristics of faces within images. A score is calculated based on the combinations of the differences, by referring to a predetermined score table (step SS1-2). The calculated score is added to a score which has been calculated by the immediately preceding weak classifier, to calculate a cumulative score (step SS1-3). However, the first weak classifier WC1 does not have a preceding weak classifier, and therefore, the score calculated by itself is designated to be the cumulative score. Whether the partial image represents a face is discriminated, based on whether the cumulative score is greater than or equal to a predetermined threshold value (step SS1-4). Here, in the case that the partial image is judged to represent a face, the partial image is output to the next weak classifier WC2 to be judged thereby (step SS2). In the case that the partial image is judged to not represent a face, the partial image is identified to not represent a face (step SSB), and the processes end.

In step SS2, the weak classifier WC2 calculates characteristic amounts that represent characteristics of the partial image (step SS2-1), and calculates a score by referring to the score table (step SS2-2), in a manner similar to that of step SS1. Then, the cumulative score is updated, by adding the calculated score to the cumulative score calculated by the preceding weak classifier WC1 (step SS2-3). Thereafter, whether the partial image represents a face is judged, based on whether the cumulative score is greater than or equal to a predetermined threshold value (step SS2-4). Here as well, in the case that the partial image is judged to represent a face, the partial image is output to the next weak classifier WC3 to be judged thereby (step SS3). In the case that the partial image is judged to not represent a face, the partial image is identified to not represent a face (step SSB), and the processes end. If the partial image is judged to represent a face by all N weak classifiers, the partial image is ultimately extracted as a face candidate (step SSA).

Each of the classifiers 341 through 343 and 351 through 353 comprises a plurality of weak classifiers having types of characteristic amounts, score tables, and threshold values, which are unique thereto. The classifiers 33 through 35 judge whether partial images W are faces facing forward, facing left, and facing right, respectively.

The redundant detection discriminating section 40 organizes faces, which have been redundantly detected by the face detecting section 30 within each image of the resolution image group S1', as single facial images S3, based on positional data of the faces S2 detected therein. Then, the redundant detection discriminating section 40 outputs the true facial images S3, which have been detected within the input images S0. The reason why the faces S3 are organized is as follows. Depending on learning methods, classifiers are capable of detecting faces within a range of sizes. Therefore, there are cases in which the same face is redundantly detected within a plurality of resolution images having adjacent resolution levels.

Figure 9:
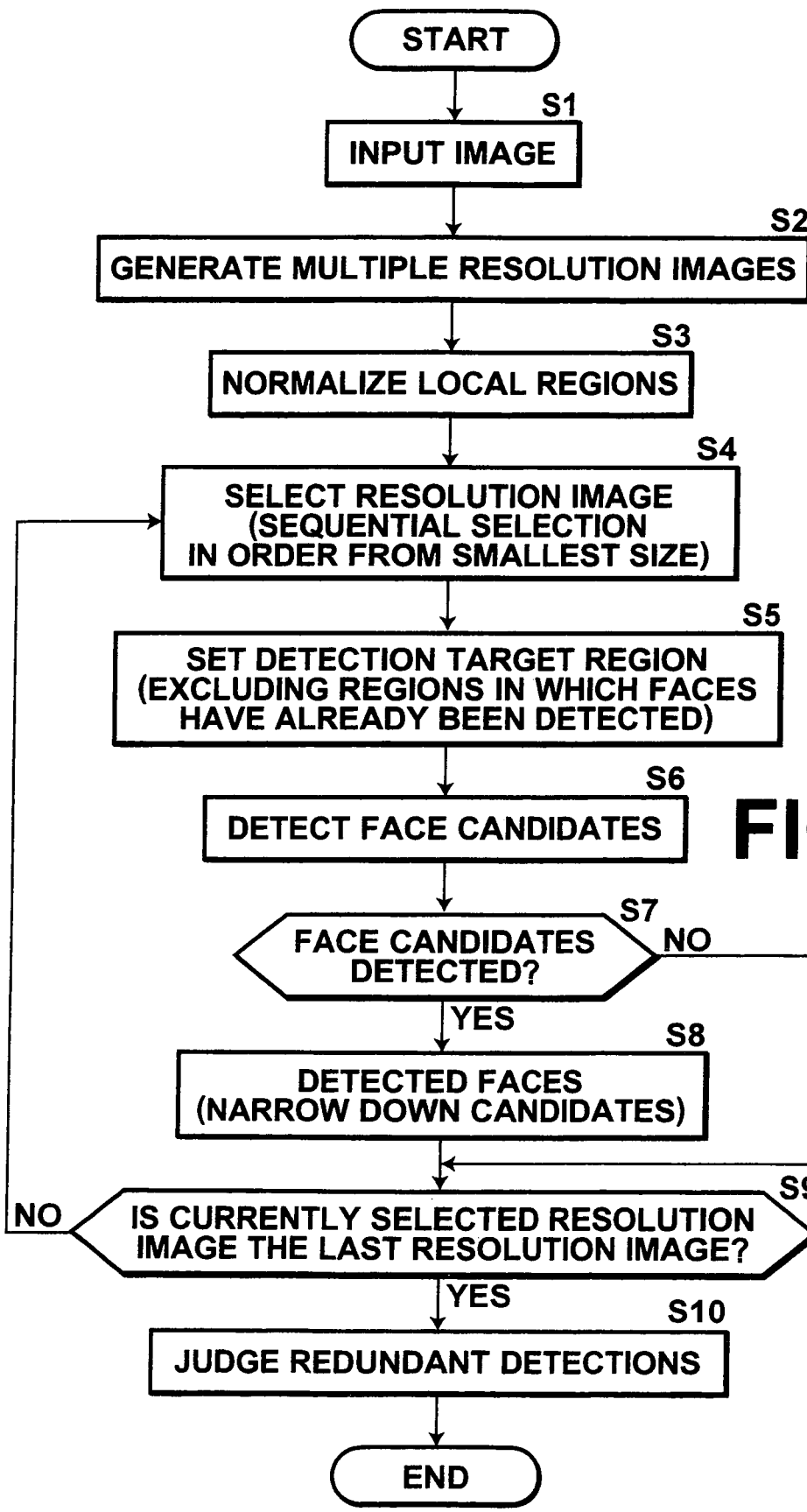
FIG. 9 is a flow chart that illustrates the processes performed by the face detecting system of FIG. 1.

FIG. 9 is a flow chart that illustrates the processes performed by the face detecting system 1. As illustrated in FIG. 9, when an input image S0 is input (step S1) to the multiple resolution image generating section 10, the input image S0 is converted to an image S1 of the predetermined size, and the resolution image group S1, constituted by a plurality of resolution images that decrease in resolution by factors of $2^{-1/3}$, are generated from the image S1 (step S2). Next, the local region normalizing section 20 administers the local region normalizing process for suppressing fluctuations in contrast at local regions, to the entireties of each resolution image of the resolution image group S1. That is, normalization is administered by converting brightness gradations of local regions, having degrees of variance of pixel values greater than or equal to the threshold value, such that the degree of variance approach the second predetermined level, and by converting brightness gradations of local regions, having degrees of variance of pixel values less than the threshold value, such that the degrees of variance are suppressed to be lower than the second predetermined level, thereby obtaining the normalized resolution image group S1' (step S3). The resolution image secting section 32 of the face detecting section 30 sequentially selects resolution images from the normalized resolution image group S1', in order from smallest to largest, that is, in the order: S1'_n, S1'_n−1, S1'_n−2, . . . S1'_1, according to commands issued by the detection control section 31 (step S4). Next, the detection control section 31 sets subwindow setting conditions to define detection target regions as regions within the resolution images S1'_i excluding regions in which faces have already been detected. According to this setting, the subwindow setting section 33 sets the detection target region as regions in which faces have not yet been detected (step S5). In addition, the detection control section 31 sets the subwindow setting conditions such that the detection mode is rough detection. According to this setting, the subwindow setting section 33 sequentially cuts out partial images W of a predetermined size while moving the subwindow at a wide pitch, for example, 5 pixels, and outputs the partial images W to the first classifier group 34. Then, the first classifier group 34 employs the forward facing face classifier 341, the left profile face classifier 342, and the right profile face classifier 343 to perform discriminations with respect to each of the partial images W. Thereby, facial image candidates within the resolution images S1'_i are roughly detected (step S6).

When detection is completed in all of the detection target regions, the detection control section 31 judges whether facial image candidates have been detected (step S7). In the case that it is judged that facial image candidates have been detected, the process continues to step S8, to perform further detection to narrow down the facial image candidates. On the other hand, in the case that it is judged that no facial image candidates have been detected, the process moves to step S9, to judge whether the currently selected resolution image S1_i is the last resolution image.

Instep S8, the detection control section 31 sets the subwindow setting conditions such that the detection target regions are limited to regions of predetermined sizes that include the facial image candidates, and sets the detection mode to narrow down mode. According to these settings, the subwindow setting section 33 sequentially cuts out partial images W of a predetermined size while moving the subwindow at a narrow pitch, for example, 1 pixel, and outputs the partial images W to the second classifier group 35. Then, the second classifier group 35 employs the forward facing face classifier 351, the left profile face classifier 352, and the right profile face classifier 353 to extract true facial images S2 from among the facial image candidates detected in the resolution image S1_i (step S8).

When the detection in narrow down mode is completed within the vicinities of the facial image candidates, the detection control section 31 judges whether the currently selected resolution image S1'_i is the last image in the selection order (step S9). In the case that it is judged in step S9 that the resolution image S1'_i is the last resolution image, the detection process ends, and the process continues to the redundant detection judgment (step S10). On the other hand, if it is judged in step S9 that the resolution image S1'_i is not the last resolution image, the process returns to step S4. Then, the resolution image selecting section 32 selects a resolution image S1'_i−1, which is one stepwise increment greater in size than the currently selected resolution image S1'_i. Further, the detection target regions are set, and detection of facial images is executed. In the case that true facial images S2 are detected in step S8, the detection control section 31 determines the region of the input image S0 that the detected facial image corresponds to. When the detection target region is set in the next step S5, the region that corresponds to the detected facial image is excluded from the detection target region.

Figure 8:
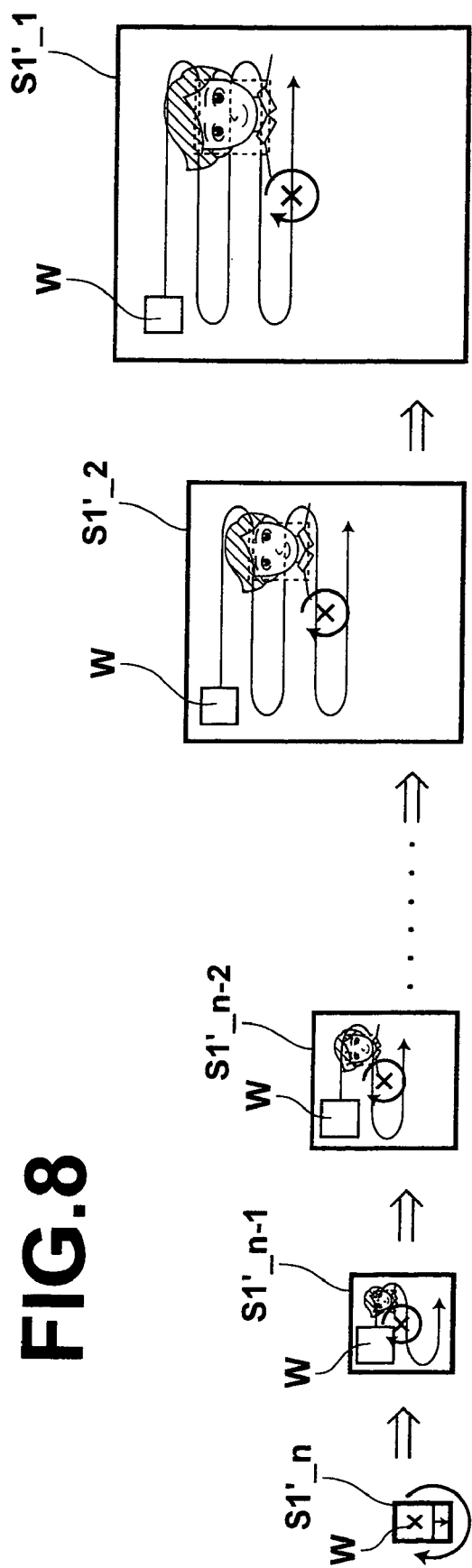
FIG. 8 is a diagram for explaining rotation of a plurality of resolution images having different resolutions, and movement of a subwindow.

By repeating the processes from step S4 through step S9 in this manner, facial images S2 can be detected from each of the resolution images. FIG. 8 illustrates the manner in which resolution images are selected in order from smallest to largest, face detection is executed, and face detection is continued excluding a region in which a face is detected.

In step S10, the redundant detection discriminating section 40 organizes redundantly detected true facial images S2 into single facial images, and outputs the single faces as true facial images S3, detected within the input image S0.

Figure 10:
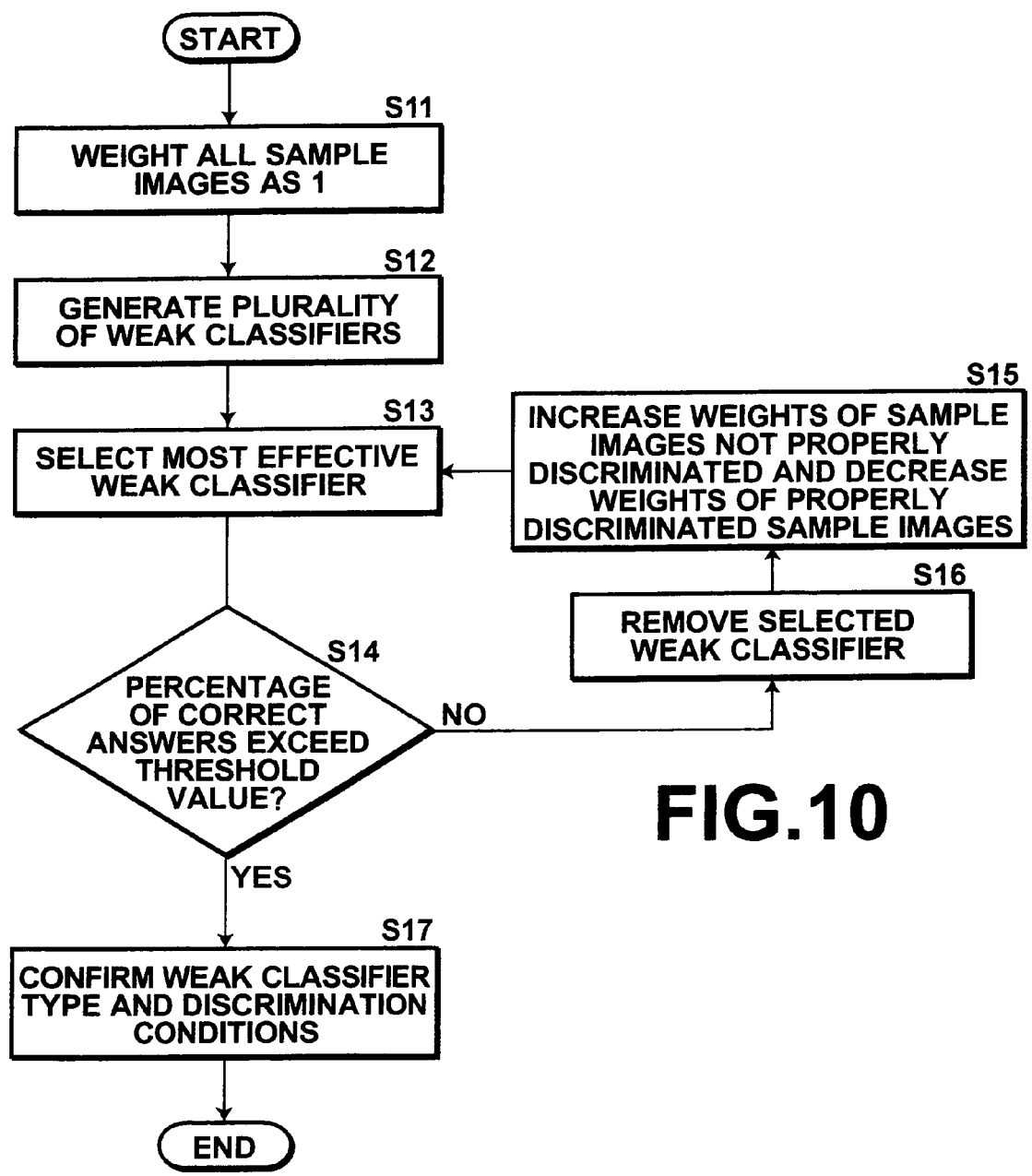
FIG. 10 is a flow chart that illustrates a learning method of the classifier.

Next, the learning method for the classifiers will be described. FIG. 10 is a flow chart that illustrates the learning method for the classifiers. Note that the learning process is performed for each type of classifier, that is, for each direction that the faces to be detected are facing.

Figure 14:
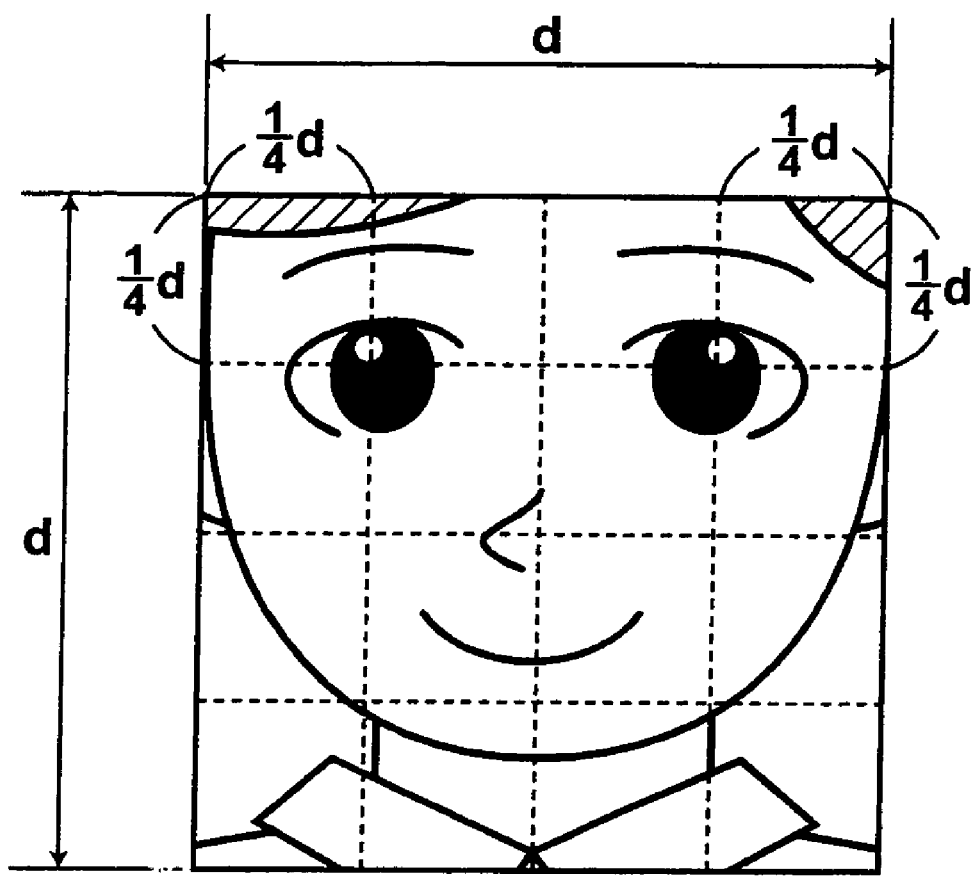
FIG. 14 illustrates a sample image, which has been standardized such that eyes pictured therein are at predetermined positions.

A sample image group, which is the subject of learning, comprises a plurality of sample images, which are known to be of faces, and a plurality of sample images, which are known to not be of faces. The sample images are standardized to be of a predetermined size, for example, 32×32 pixels. Note that in the sample images, which are known to be of faces, the direction that the faces to be detected by each classifier are facing are matched, as well as the vertical orientations thereof. Variations of each sample image, which are known to be of faces, are employed. That is, the vertical and/or horizontal dimensions of each sample image are enlarged/reduced at 0.1× increments within a range of 0.7× to 1.2×. Each of the enlarged/reduced sample images are also rotated in three degree increments within a range of ±15 degrees within the planes thereof. Note that at this time, the sizes and positions of the sample images of faces are standardized such that the eyes therein are at predetermined positions. The enlargement/reduction and rotation are performed with the positions of the eyes as the reference points. For example, in the case of a sample image in which a forward facing face is pictured, the size and the position of the face are standardized such that the positions of the eyes are d/4 down and d/4 toward the interior from the upper left and upper right corners of the image, as illustrated in FIG. 14. The rotation and enlargement/reduction are performed with the center point between the eyes as the center of the image. Each sample image is weighted, that is, is assigned a level of importance. First, the initial values of weighting of all of the sample images are set equally to 1 (step S11).

Next, weak classifiers are generated for each of a plurality of different pair groups, constituted by pairs of points which are set within the planes of the sample images and the enlarged/reduced sample images (step S12). Here, each weak classifier has a function of providing a reference to discriminate images of faces from those not of faces, by employing combinations of the differences between pixel values (representing brightness) of each pair of points that constitute the pair group. In the present embodiment, histograms of combinations of the differences between each pair of points that constitutes a single pair group are utilized as the bases for score tables for each weak classifier.

Figure 11:
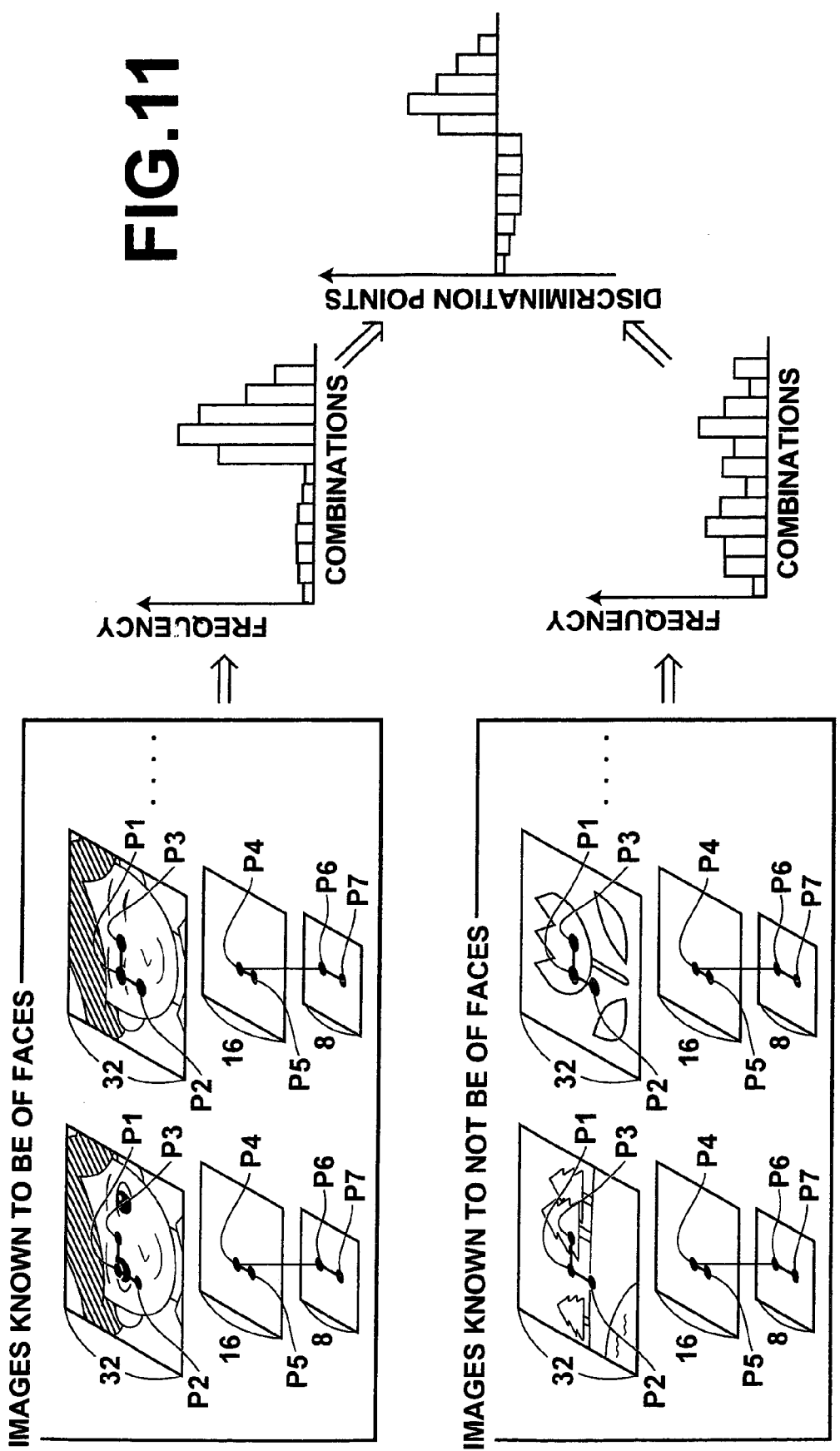
FIG. 11 is a diagram that illustrates a method by which histograms of the weak classifiers are derived.

The generation of a weak classifier will be described with reference to FIG. 11. As illustrated in the sample images at the left side of FIG. 11, the pairs of points that constitute the pair group for generating the weak classifier are five pairs, between points P1 and P2, P1 and P3, P4 and P5, P4 and P6, and P6 and P7. The point P1 is located at the center of the right eye, the point P2 is located within the right cheek, and the point P3 is located within the forehead of the sample images. The point P4 is located at the center of the right eye, and the point P5 is located within the right cheek, of a 16×16 pixel size image, obtained by administering the four neighboring pixel average process on the sample image. The point P5 is located at the center of the right eye, and the point P7 is located within the right cheek, of an 8×8 pixel size image, obtained by administering the four neighboring pixel average process on the 16×16 pixel size image. Note that the coordinate positions of the pairs of points that constitute a single pair group for generating a single weak classifier are the same within all of the sample images. Combinations of the differences between the pixel values of each of the five pairs of points that constitute the pair group are calculated for all of the sample images, and a histogram is generated.

Here, the values of the combinations of differences between pixel values depend on the number of brightness gradations. In the case that the number of brightness gradations is expressed as 16 bit data, there are 65536 possible differences for each pair of pixel values. Therefore, there are 65536 to the (number of pairs) power, as total possible values of the combinations. In this case, there are $65536^5$ possible values, which would require a great number of samples, a great amount of time, and a great amount of memory to execute learning and detection. Therefore, in the present embodiment, the differences between the pixel values are sectioned at appropriate widths of numerical values, to quantify them into n values (n=100, for example).

Thereby, the number of combinations of differences between pixel values becomes $n^5$, and the amount of data that represents the differences between pixel values can be reduced.

In a similar manner, histograms are generated for the plurality of sample images, which are known to not be of faces. Note that in the sample images, which are known to not be of faces, points (denoted by the same reference numerals P1 through P7) at positions corresponding to the pixels P1 through P7 of the sample images, which are known to be of faces, are employed in the calculation of the differences between pixel values. Logarithms of the ratios of the frequencies in the two histograms are represented by the rightmost histogram illustrated in FIG. 11, which is employed as the basis for the score table of the weak classifier. The values along the vertical axis of the histogram of the weak classifier will be referred to as discrimination points. According to the weak classifier, images that have distributions of the combinations of differences between pixel values corresponding to positive discrimination points therein are highly likely to be of faces. The likelihood that an image is of a face increases with an increase in the absolute values of the discrimination points. On the other hand, images that have distributions of the combinations of differences between pixel values corresponding to negative discrimination points are highly likely to not be of faces. Again, the likelihood that an image is not of a face increases with an increase in the absolute values of the negative discrimination points. A plurality of weak classifiers are generated in histogram format regarding combinations of the differences between pixel values of pairs of the plurality of types of pair groups in step S12.

Thereafter, a weak classifier, which is most effective in discriminating whether an image is of a face, is selected from the plurality of weak classifiers generated in step S12. The selection of the most effective weak classifier is performed while taking the weighting of each sample image into consideration. In this example, the percentages of correct discriminations provided by each of the weak classifiers are compared, and the weak classifier having the highest weighted percentage of correct discriminations is selected (step S13). At the first step S3, all of the weighting of the sample images are equal, at 1. Therefore, the weak classifier that correctly discriminates whether sample images are of faces with the highest frequency is selected as the most effective weak classifier. On the other hand, the weightings of each of the sample images are renewed at step S15, to be described later. Thereafter, the process returns to step S13. Therefore, at the second step S13, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S13's, more importance is placed on correctly discriminating heavily weighted sample images than lightly weighted sample images.

Next, confirmation is made regarding whether the percentage of correct discriminations of a combination of the weak classifiers which have been selected, that is, weak classifiers that have been utilized in combination (it is not necessary for the weak classifiers to be linked in a linear configuration in the learning stage) exceeds a predetermined threshold value (step S14). That is, the percentage of discrimination results regarding whether sample images are of faces, which are obtained by the combination of the selected weak classifiers, that match the actual sample images is compared against the predetermined threshold value. Here, the sample images, which are employed in the evaluation of the percentage of correct discriminations, may be those that are weighted with different values, or those that are equally weighted. In the case that the percentage of correct discriminations exceeds the predetermined threshold value, whether an image is of a face can be discriminated by the selected weak classifiers with sufficiently high accuracy, therefore the learning process is completed. In the case that the percentage of correct discriminations is less than or equal to the predetermined threshold value, the process proceeds to step S16, to select an additional weak classifier, to be employed in combination with the weak classifiers which have been selected thus far.

The weak classifier, which has been selected at the immediately preceding step S13, is excluded from selection in step S16, so that it is not selected again.

Next, the weighting of sample images, which were not correctly discriminated by the weak classifier selected at the immediately preceding step S13, is increased, and the weighting of sample images, which were correctly discriminated, is decreased (step S15). The reason for increasing and decreasing the weighting in this manner is to place more importance on images which were not correctly discriminated by the weak classifiers that have been selected thus far. In this manner, selection of a weak classifier which is capable of correctly discriminating whether these sample images are of a face is encouraged, thereby improving the effect of the combination of weak classifiers.

Thereafter, the process returns to step S13, and another effective weak classifier is selected, using the weighted percentages of correct discriminations as a reference.

The above steps S13 through S16 are repeated to select weak classifiers corresponding to combinations of the differences between pixel values for each pair that constitutes specific pair groups, which are suited for discriminating whether faces are included in images. If the percentages of correct discriminations, which are evaluated at step S14, exceed the threshold value, the type of weak classifier and discrimination conditions, which are to be employed in discrimination regarding whether images include faces, are determined (step S17), and the learning process is completed. In addition, a score table, for calculating scores according to combinations of differences between pixel values, is generated for each weak classifier, based on the histograms therefor. Note that the histograms themselves may be employed as the score tables. In this case, the discrimination points of the histograms become the scores.

Note that in the case that the learning technique described above is applied, the weak classifiers are not limited to those in the histogram format. The weak classifiers may be of any format, as long as they provide references to discriminate between images of faces and other images by employing combinations of the differences between pixel values of each pair that constitutes specific pair groups. Examples of alternative weak classifiers are: binary data, threshold values, functions, and the like. As a further alternative, a histogram that represents the distribution of difference values between the two histograms illustrated in the center of FIG. 11 may be employed, in the case that the weak classifiers are of the histogram format.

The learning technique is not limited to that which has been described above. Other machine learning techniques, such as a neural network technique, may be employed.

According to the method and apparatus for detecting faces of the present embodiment, faces are searched for within the detection target image in order from larger faces. If a face is detected, the region in which the face is detected is excluded from the search regions of further searches, as it can be assumed that no faces larger than the detected face are present within the region. Therefore, extraneous detection processes can be omitted with respect to the excluded regions, enabling processing time to be shortened, that is, enabling high speed face detection.

Note that in the first embodiment described above, a configuration is adopted, wherein "faces smaller than a detected face are not searched for in regions in which the face is detected". Alternatively, a configuration may be adopted, wherein "(1) if the degree of likelihood that a detected face is actually a face (for example, a score value that reflects the likelihood of being a face) is sufficiently high, then faces smaller than the detected face are not searched for; and (2) if the degree of likelihood that a detected face is actually a face is significant, but not sufficiently high, the detected face is designated as a preliminary face, further searches are conducted in the region corresponding thereto, and in the case that a smaller face having a sufficiently high likelihood of being a face is detected in the corresponding region, the preliminary face is judged to not be a face".

Figure 15:
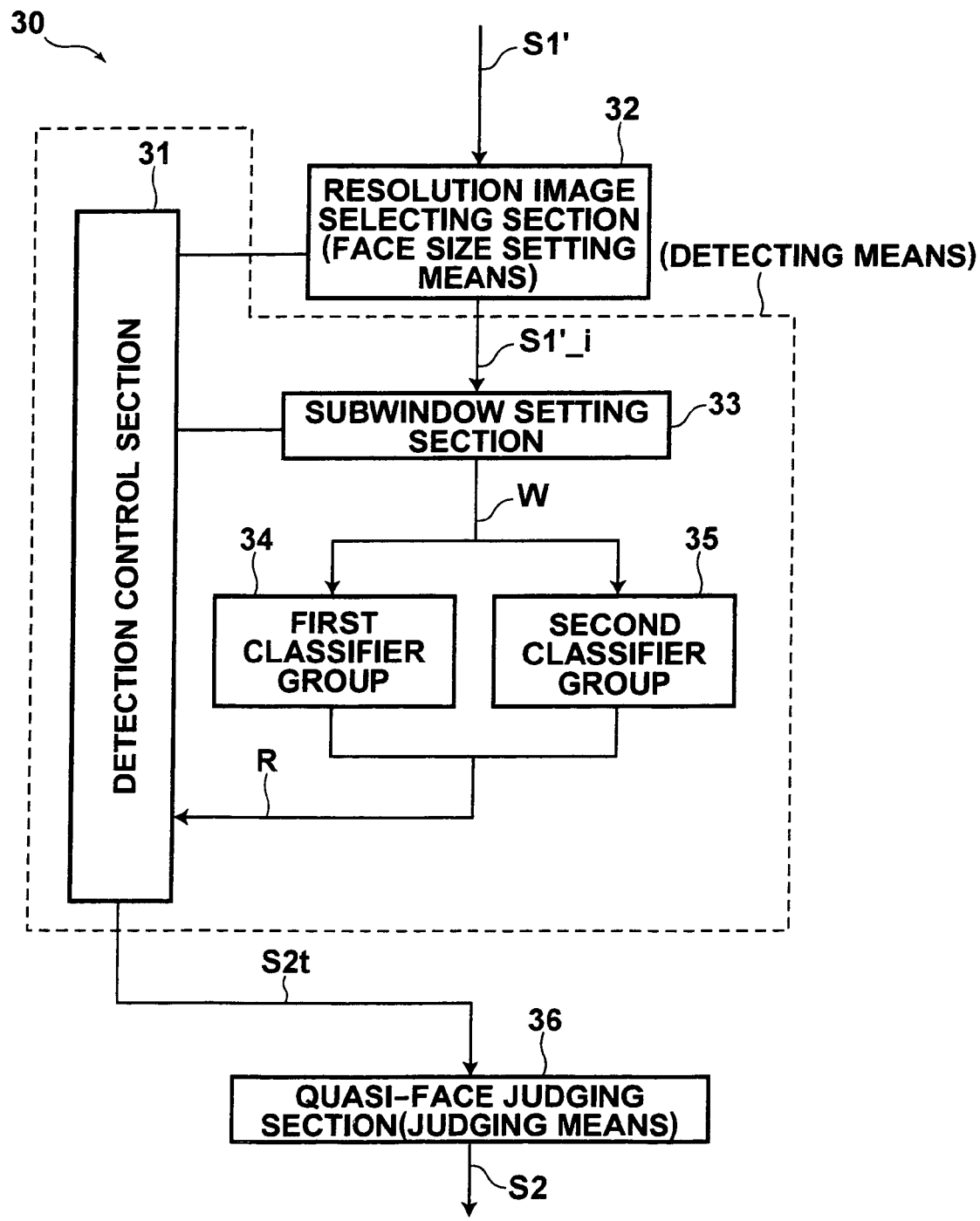
FIG. 15 is a block diagram that illustrates the schematic construction of a face detecting section of a face detecting system according to a second embodiment of the present invention.

FIG. 15 is a block diagram that illustrates the schematic construction of a face detecting section 30 of a face detecting system 1 according to a second embodiment of the present invention. The face detecting section 30 of FIG. 15 comprises a detecting section (detecting means) constituted by: a detection control section 31; a subwindow setting section 33; a first classifier group 34; and a second classifier group 35. The detecting section employs characteristic amounts related to the brightness distributions of detection target images to detect "faces", and "quasi-faces" that exhibit degrees of likelihood of being faces less than those of the faces. The processes of a resolution image selecting section 32 (face size setting means) selecting resolution images (setting sizes of faces to be detected) and the detecting section administering face detecting processes (detecting faces of the set sizes) are repeated a plurality of times. The face detecting section further comprises a quasi-face judging section 36 (judging means), for judging quasi-faces that surround the positions of the detected faces to not be faces, and judging other quasi-faces to be faces.

Here, the functions of the detection control section 31, the resolution image selecting section 32, the subwindow setting section 33, the first classifier group 34, and the second classifier group 35 are basically the same as those of the first embodiment described previously. However, the detection control means 31 performs the following additional functions after detection by the second classifier group 35 to narrow down the facial image candidates. After the discriminating processes by the classifiers that constitute the second classifier group 35, not only are the partial images W judged to be facial images by the last weak classifier judged to be facial images, but even partial images W which have been judged to not be facial images by an intermediate weak classifier are (1) judged to represent "faces" if the final cumulative score of a partial image W≧a predetermined threshold value Th1; (2) judged to represent "quasi-faces" if the threshold value Th1>the final cumulative score≧a predetermined threshold value Th2 (Th1>Th2); and (3) judged to "not represent faces" if the threshold value Th2>the final cumulative score. In addition, the quasi-face judging section 36 judges "quasi-faces" that surround the positions of the detected "faces" to not be faces, and judges other quasi-faces to be faces. The threshold value Th1 corresponds to a borderline at which the partial image W exhibits sufficient likelihood to represent a "face". The threshold value Th2 corresponds to a borderline between "non-faces", which are considered to not be faces, and "quasi-faces", which may be considered to be faces, but for which the likelihood is not sufficient.

FIG. 16 is a flow chart that illustrates the processes performed by the face detecting system 1 of the second embodiment. Steps S1 through S7 are the same processes as those described in the first embodiment, and therefore detailed descriptions thereof will be omitted. In the step S8 of the present embodiment, the partial images W are judged as being one of a "face", a "quasi-face" or a "non-face" according to the final cumulative score thereof, assigned by the classifiers that constitute the second classifier group 35. Images S2t, of "faces" and "quasi-faces" are obtained as the judgment results. After it is confirmed in step S9 that the currently selected resolution image is the last resolution image (step S9), that is, detection of faces has been completed for all resolution images, the quasi-face judging section 36 performs judgments regarding the images S2t. The quasi-face judging section 36 judges "quasi-faces" that surround "faces" to be "non-faces", and judges other "quasi-faces" to be "faces". Thereby, partial images W, which are ultimately judged to represent "faces", are obtained as images S2 (step S9-2). Thereafter, judgments regarding redundant detections are performed, to obtain images S3 as detection results without redundancies (step S10), and the process ends.

According to the second embodiment configured as described above, a configuration is adopted, wherein: if the degree of likelihood that a detected face is actually a "face" is sufficiently high, then faces smaller than the detected "face" are not searched for; if the degree of likelihood that a detected face is actually a face is significant, but not sufficiently high, the detected face is designated as a "quasi-face", further searches are conducted in the region corresponding thereto, and in the case that a smaller face having a sufficiently high likelihood of being a "face" is detected in the corresponding region, the "quasi-face" is judged to be a "non-face", and other "quasi-faces" are judged to be "faces". Based on the face that the probability of a smaller face being present within a face is low, extraneous detection processes within facial regions which have already been detected can be omitted. Therefore, the processing time can be shortened. In addition, erroneous detection of images, of which the degrees of likelihood of being faces are insufficient and therefore judgments regarding whether they are facial images are difficult, can be suppressed. That is, a high speed face detection process at a high detection accuracy can be realized.

Methods and apparatuses according to the embodiments of the present invention have been described above. Programs that cause a computer to execute the processes administered by the face discriminating apparatuses are also embodiments of the present invention. Further, computer readable media in which such programs are recorded are also embodiments of the present invention.

What is claimed is:

1. A face detecting method, comprising:

a face size setting step, for setting the size of faces to be detected from within a detection target image to various sizes; and a detecting step, for detecting faces of the size set in the face size setting step from within the detection target image;

the face size setting step and the detecting step being repeated, thereby detecting faces of different sizes included in the detection target image;

the face size setting step setting the size of faces to be detected such that the size decreases from large to small; and the detecting step detecting faces from regions within the detection target image, excluding regions in which faces have already been detected.

2. A face detecting method as defined in claim 1, wherein:

the detecting step employs characteristic amounts related to the brightness distribution of the detection target image to detect faces and quasi-faces that exhibit degrees of likelihood of being faces less than the detected faces; and the method further comprises:

a judging step, for judging quasi-faces that surround the positions of the detected faces as not being faces, after the face size setting step and the detecting step have been repeated a plurality of times, while judging other quasi-faces to be faces.

3. A face detecting method as defined in claim 2, wherein the detecting step:

employs the characteristic amounts to calculate an index that represents the probability that a partial image, cut out from the detection target image, is an image that includes a face;

detects the subject of the partial image as a face if the index is greater than or equal to a first threshold value; and detects the subject of the partial image as a quasi-face if the index is less than the first threshold value and greater than or equal to a second threshold value, which is less than the first threshold value.

4. A face detecting apparatus, comprising:

face size setting means, for setting the size of faces to be detected from within a detection target image to various sizes; and detecting means, for detecting faces of the size set in the face size setting step from within the detection target image;

the setting of the face size and the detection of the faces being repeated, thereby detecting faces of different sizes included in the detection target image;

the face size setting means setting the size of faces to be detected such that the size decreases from large to small; and the detecting means detecting faces from regions within the detection target image, excluding regions in which faces have already been detected.

5. A face detecting apparatus as defined in claim 4, wherein:

the detecting means employs characteristic amounts related to the brightness distribution of the detection target image to detect faces and quasi-faces that exhibit degrees of likelihood of being faces less than the detected faces; and the apparatus further comprises:

judging means, for judging quasi-faces that surround the positions of the detected faces as not being faces, after the face size setting step and the detecting step have been repeated a plurality of times, while judging other quasi-faces to be faces.

6. A face detecting apparatus as defined in claim 5, wherein the detecting means:

employs the characteristic amounts to calculate an index that represents the probability that a partial image, cut out from the detection target image, is an image that includes a face;

detects the subject of the partial image as a face if the index is greater than or equal to a first threshold value; and detects the subject of the partial image as a quasi-face if the index is less than the first threshold value and greater than or equal to a second threshold value, which is less than the first threshold value.

7. A computer readable medium having recorded therein a program that causes a computer to execute:

a face size setting procedure, for setting the size of faces to be detected from within a detection target image to various sizes; and a detecting procedure, for detecting faces of the size set in the face size setting step from within the detection target image;

the face size setting procedure and the detecting procedure being repeated, thereby detecting faces of different sizes included in the detection target image;

the face size setting procedure setting the size of faces to be detected such that the size decreases from large to small; and the detecting procedure detecting faces from regions within the detection target image, excluding regions in which faces have already been detected.

8. A computer readable medium as defined in claim 7, wherein:

the detecting procedure employs characteristic amounts related to the brightness distribution of the detection target image to detect faces and quasi-faces that exhibit degrees of likelihood of being faces less than the detected faces; and the program further comprises:

a judging procedure, for judging quasi-faces that surround the positions of the detected faces as not being faces, after the face size setting step and the detecting step have been repeated a plurality of times, while judging other quasi-faces to be faces.

9. A computer readable medium as defined in claim 8, wherein the detecting procedure:

employs the characteristic amounts to calculate an index that represents the probability that a partial image, cut out from the detection target image, is an image that includes a face;

detects the subject of the partial image as a face if the index is greater than or equal to a first threshold value; and detects the subject of the partial image as a quasi-face if the index is less than the first threshold value and greater than or equal to a second threshold value, which is less than the first threshold value.

* * * * *